(12) United States Patent
Agari

(10) Patent No.: US 7,741,818 B2
(45) Date of Patent: Jun. 22, 2010

(54) VOLTAGE REGULATOR INCLUDING AN OUTPUT UNIT FOR CONVERTING INPUT VOLTAGE INTO A PREDETERMINED VOLTAGE AND FOR OUTPUTTING THE CONVERTED VOLTAGE

(75) Inventor: Hideki Agari, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 352 days.

(21) Appl. No.: 11/810,366

(22) Filed: Jun. 4, 2007

(65) Prior Publication Data

US 2008/0007234 A1 Jan. 10, 2008

(30) Foreign Application Priority Data

Jun. 26, 2006 (JP) ............................. 2006-175624

(51) Int. Cl.
*G05F 1/595* (2006.01)
(52) U.S. Cl. ...................... 323/224; 323/303; 307/86
(58) Field of Classification Search ................. 323/224, 323/303, 225, 299, 266; 307/80–82, 86, 307/85, 87
See application file for complete search history.

(56) References Cited

U.S. PATENT DOCUMENTS

| | | | | |
|---|---|---|---|---|
| 5,161,097 A | * | 11/1992 | Ikeda | ........................ 363/124 |
| 5,216,351 A | * | 6/1993 | Shimoda | ...................... 323/224 |
| 6,275,014 B1 | * | 8/2001 | Sudo | ........................... 323/222 |
| 2006/0006850 A1 | * | 1/2006 | Inoue et al. | .................. 323/265 |

FOREIGN PATENT DOCUMENTS

| | | |
|---|---|---|
| CN | 1503441 A | 6/2004 |
| CN | 1667932 A | 9/2005 |
| JP | 1-164266 | 6/1989 |
| JP | 2004-62331 | 2/2004 |
| JP | 2005-339467 | 12/2005 |
| JP | 2006-81369 | 3/2006 |
| WO | WO 2005096482 A1 * | 10/2005 |

OTHER PUBLICATIONS

Jan. 9, 2009 Chinese official action (and English translation thereof) in connection with a counterpart Chinese patent application No. 200710126271.1.

* cited by examiner

*Primary Examiner*—Harry Behm
(74) *Attorney, Agent, or Firm*—Cooper & Dunham LLP

(57) ABSTRACT

A voltage regulator is disclosed. The voltage regulator includes an output unit for converting an input voltage provided by a power source into a predetermined voltage, and for outputting the converted voltage, a monitoring unit for determining whether the input voltage provided by the power source is greater than a reference voltage, and a step-up unit for stepping up the input voltage provided by the power source if the monitoring unit determines that the input voltage is less than the reference voltage. The output unit includes a converting unit for converting the stepped-up voltage into the predetermined voltage.

6 Claims, 4 Drawing Sheets

VOLTAGE REGULATOR INCLUDING AN OUTPUT UNIT FOR CONVERTING INPUT VOLTAGE INTO A PREDETERMINED VOLTAGE AND FOR OUTPUTTING THE CONVERTED VOLTAGE

BACKGROUND OF THE INVENTION

1. Technical Field of the Invention

This disclosure generally relates to a voltage regulator, and especially relates to a voltage regulator that is capable of providing an output voltage at a predetermined voltage regardless of a fluctuation of an input voltage.

2. Description of the Related Art

[Background Technique]

In recent years and continuing, for environmental reasons, power saving is required of electrical apparatuses, especially battery-driven apparatuses. Generally, lithium ion batteries are used by the electrical apparatuses such as a notebook PC, a cellular phone, and a PDA (Personal Digital Assistant).

The cut-off voltage (end of discharge voltage) of the lithium ion batteries used to be about 3 V, which is now improved to be 2.5 V or less so that a longer service period is provided before recharging becomes necessary.

Patent Reference 1 discloses a voltage regulator that includes a two-step operational amplifier that is constituted by a differential amplifier, and an output unit arranged on the same semi-conductor substrate by a MOSFET circuit. The voltage regulator further includes a reference voltage generating unit. A reference voltage generated by the reference voltage generating unit is provided to one of input terminals of the differential amplifier. To the other terminal of the differential amplifier is connected an output voltage of the output unit, which output voltage is divided by a feedback resistor. Then, the output of the differential amplifier is provided to an input terminal of the output unit. A power supply voltage of the differential amplifier is less than a power supply voltage of the output unit; specifically, the power supply voltage to the differential amplifier is stepped-up and is provided to the output unit.

Patent Reference 2 discloses an electronic apparatus that realizes power-saving effectiveness by improving power-source effectiveness of a battery. According to the electronic apparatus, the output voltage of the battery is compared with a predetermined voltage; if the output voltage is greater than the predetermined voltage, the output voltage of the battery is converted to a second voltage by an output control unit; if the output voltage is less than the predetermined voltage, the output voltage is stepped up to a first voltage, and then converted to the second voltage by the output control unit.

[Patent reference 1] JPA 2005-339467
[Patent reference 2] JPA 2006-081369

Although the voltage regulator proposed by Patent Reference 1 (JPA 2005-339467) increases the power supply voltage to the differential amplifier by a step-up unit, and the stepped-up voltage is supplied to the output unit, the step-up unit cannot be turned on and off.

Further, as described above, as for the lithium ion battery used by the electronic apparatuses, the cut-off voltage is improved to be less than 3 V. However, there are cases wherein the electronic apparatuses operate at a voltage greater than 3 V, in which case, a voltage output from the lithium ion battery has to be stepped up. With the electronic apparatus of Patent Reference 2 (WA 2006-081369), the output voltage of the battery is compared with the predetermined voltage. If the output voltage is greater than the predetermined voltage, the output voltage is adjusted to the second voltage by the output control unit; and if the output voltage is less than the predetermined voltage, the output voltage is stepped up to the first voltage, and then converted to the second voltage by the output control unit. Here, the step-up unit is prepared on an IC substrate different from the voltage regulator. For this reason, circuit scale becomes great, circuit configuration becomes complicated, and the electronic apparatus becomes great in size. Further, when the voltage is stepped up for providing power to the electronic apparatus, electric power is consumed by the step-up unit, which degrades the power-source effectiveness of the battery. Furthermore, if a DC-to-DC converter is used as the step-up unit, as proposed by Patent Reference 2, costs are increased and the electric power consumed by the DC-to-DC converter is great.

SUMMARY

In an aspect of this disclosure there is provided a voltage regulator that is capable of constantly providing a predetermined voltage regardless of a fluctuation of an input voltage, wherein a monitoring unit monitors the input voltage; if the input voltage becomes less than a predetermined voltage, energy is discharged from a step-up unit to maintain the output voltage.

According to another aspect of this disclosure, the voltage regulator includes an output unit for converting a voltage of a power source into a predetermined voltage, and for outputting the converted voltage, a monitoring unit for determining whether the input voltage provided by the power source is greater than a reference voltage, and a step-up unit for stepping up the input voltage provided by the power source if the monitoring unit determines that the input voltage is less than the reference voltage, wherein the output unit converts the stepped-up voltage to the predetermined voltage.

According another aspect of this disclosure, the monitoring unit includes a reference voltage generating unit for generating the reference voltage, and a comparing unit for comparing the input voltage with the reference voltage, wherein a signal for turning the step-up unit on is provided if the comparison unit determines that the input voltage is less than the reference voltage.

In another aspect of this disclosure, there is provided a voltage regulator that includes an output unit for converting an input voltage from a power source into a predetermined voltage, and for outputting the converted voltage, a monitoring unit for determining whether the input voltage provided by the power source is greater than a voltage defined based on the output voltage, and a step-up unit for stepping up the input voltage provided by the power source if the monitoring unit determines that the input voltage is less than the voltage that is defined based on the output voltage, wherein the output unit includes a converting unit for converting the voltage that is stepped-up by the step-up unit to the predetermined voltage.

According to another aspect of this disclosure, the monitoring unit includes a comparing unit for comparing the input voltage provided by the power source with the voltage defined based on the output voltage, and provides a signal for turning the step-up unit on if the input voltage is determined to be less than the voltage defined based on the output voltage.

According to an aspect of this disclosure, th monitoring unit includes a voltage dividing unit for dividing the input voltage provided by the power source, which divided input voltage is provided to the comparing unit.

According to another aspect of this disclosure, the voltage dividing unit gives hysteresis to the comparing unit by preparing a resistor between an output terminal and an inverting input terminal of the comparing unit.

According to another aspect of this disclosure, the voltage dividing unit includes two or more resistors arranged between the output terminal and the inverting input terminal of the comparing unit, and a resistance ratio control unit for short-circuiting one of the resistors to change a resistance ratio of the voltage dividing unit if the signal for turning the step-up unit on is provided by the comparing unit.

According to another aspect of this disclosure the step-up unit includes a disconnecting unit for disconnecting the output unit from the input voltage provided by the power source when the signal for turning the step-up unit on is provided by the comparing unit.

According to another aspect of this disclosure, the disconnecting unit includes a storage unit for holding the signal for turning the step-up unit on until the voltage regulator is turned off, and a voltage control unit for disconnecting the output unit from the input voltage provided by the power source while the signal for turning the step-up unit on is held by the storage unit.

According to another aspect of this disclosure, the output unit includes a control unit for decreasing one of the input voltage provided by the power source and the stepped-up voltage provided by the step-up unit to the predetermined voltage.

According to another aspect of this disclosure, the step-up unit includes a switching signal generating unit for periodically generating an ON/OFF signal when the signal for turning the step-up unit on is provided by the comparing unit, a coil for stepping up the input voltage provided by the power source, a first switch for connecting and disconnecting the coil and a ground level (GND) according to the ON/OFF signal generated by the switching signal generating unit, a reversing unit for reversing the ON/OFF signal generated by the switching signal generating unit, and a second switch for connecting and disconnecting the output unit and the coil according to the reversed ON/OFF signal. Then, the first switch and the second switch are opened and closed according to the periodic ON/OFF signal provided by the switching signal generating unit. In this way, storing electric power to the coil, and discharging the electric power from the coil to the output unit are repeated to step up the input voltage provided by the power source.

[Effectiveness of Invention]

As described above, according to the voltage regulator of the embodiment of the present invention, the output voltage is constantly maintained at the predetermined voltage regardless of a fluctuation of the input voltage by monitoring the input voltage provided by the power source, and by stepping up the output voltage by discharging the energy from the step-up unit when the voltage drops to a predetermined voltage.

DESCRIPTION OF THE PREFERRED EMBODIMENTS

In the following, embodiments of the present invention are described with reference to the accompanying drawings.

Figure 1:
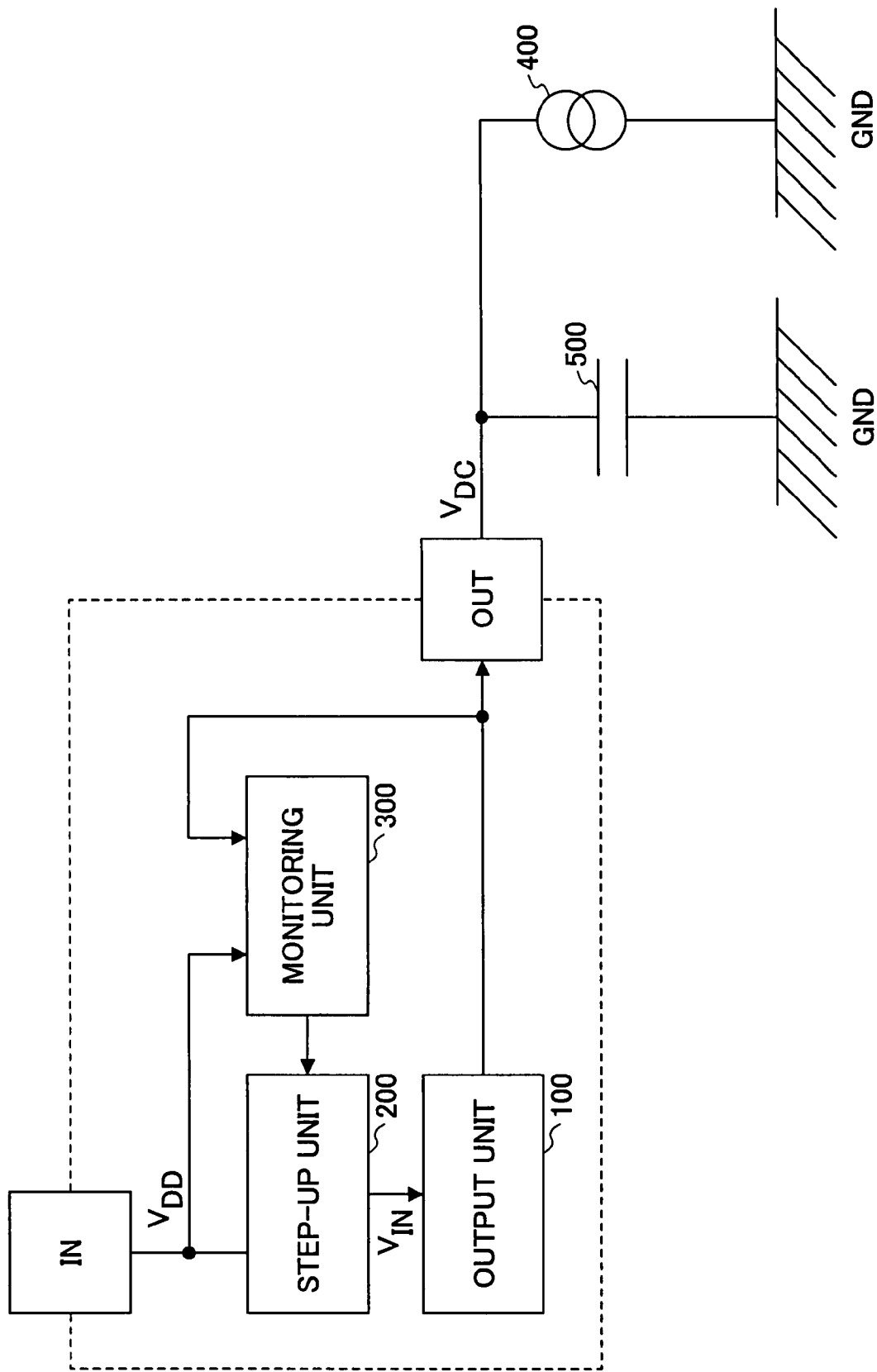
FIG. 1 is a block diagram showing the configuration of a voltage regulator according to an embodiment of the present invention.

With reference to FIG. 1, the configuration of the voltage regulator according to the embodiment of the present invention is described.

The voltage regulator includes an output unit 100, a step-up unit 200, and a monitoring unit 300. The output unit 100 receives an input that is one of an input voltage $V_{DD}$ provided through an input terminal IN and a stepped-up voltage $V_{IN}$ from the step-up unit 200. The output unit 100 provides an output to an output terminal OUT. The step-up unit 200 steps-up (increases) the voltage of the input voltage $V_{DD}$ to obtain the stepped-up voltage $V_{IN}$ to be provided to the output unit 100 according to a monitoring result of the input voltage $V_{DD}$ by the monitoring unit 300. The monitoring unit 300 monitors the voltage of the input voltage $V_{DD}$ provided through the input terminal IN. In addition, a capacitor 500 is provided between the output terminal OUT of the output unit 100 and ground potential. The capacitor 500 is for removing a ripple of the output voltage of the output unit 100 and reducing a fluctuation of the output voltage $V_{DC}$ due to a delay of the response of the output unit 100 to a fluctuation of an output current to a load 400. Furthermore, the capacitor 500 holds the output voltage $V_{DC}$ constant by reducing undershoot of the output voltage $V_{DC}$ when the input voltage $V_{DD}$ declines and before the stepped-up voltage $V_{IN}$ is provided by the step-up unit 200.

The input voltage $V_{DD}$ is provided by a power source such as a battery to the step-up unit 200 through the input terminal IN, and the output unit 100 is connected to an output terminal OUT of the step-up unit 200. The output unit 100 generates the output voltage $V_{DC}$ at a predetermined constant voltage from the input voltage $V_{DD}$, and outputs the $V_{DC}$ to the load 400. The monitoring unit 300 monitors the input voltage $V_{DD}$ provided by the power source, compares the input voltage $V_{DD}$ with a reference voltage $V_{ref}A$, provides a comparison result to the step-up unit 200, and controls operations of the step-up unit 200.

Next, a specific example of the voltage regulator according to the embodiment is described with reference to FIG. 2, which voltage regulator includes the output unit 100, the step-up unit 200, and the monitoring unit 300.

The output unit 100 includes a reference voltage generating unit 101 for generating and outputting a reference voltage $V_{ref}A$, a voltage dividing unit 104 constituted by resistors 102 and 103 for dividing the output voltage $V_{DC}$ and outputting the divided voltage $V_d$, a transistor 105 that is a PMOS transistor (P channel type MOS transistor) for controlling output, which transistor 105 outputs a current through the output terminal OUT according to a voltage that is provided to the gate of the transistor 105, and an operational amplifier 106 for controlling operations of the transistor 105 so that the divided voltage $V_d$ obtained by the voltage dividing unit 104 may become equal to the reference voltage $V_{ref}A$.

The output voltage $V_{DC}$ is divided by the voltage dividing unit 104, the difference between the divided voltage $V_d$ and the reference voltage $V_{ref}A$ is amplified by the operational amplifier 106, and the amplified difference is provided to the gate of the transistor 105. In this way, the operational amplifier 106 controls the transistor 105 so that the output voltage $V_{DC}$ may become fixed at a desired voltage.

The monitoring unit 300 includes a reference voltage generating unit 307 for generating and outputting a predetermined reference voltage $V_{ref}B$, a voltage dividing unit 305 for dividing the input voltage $V_{DD}$ with resistors 302, 303, and 304, and for outputting a divided voltage $V_{det}$, and a comparator 301 for comparing the reference voltage $V_{ref}B$ with the divided voltage $V_{det}$, and for outputting a comparison result (L: Low or H: High). The comparator 301 sensitively reacts to the reference voltage $V_{ref}B$, and outputs the comparison result. Then, hysteresis is given to the comparator 301 with the resistors 303 and 304 between the output terminal and an inverting input terminal of the comparator 301. Here, a resistance ratio of the voltage dividing unit 305 is changed by the gate of a transistor 306 being turned on and off, which transistor 306 is a NMOS transistor for resistance ratio control based on the comparison result output from the comparator 301.

Specifically, if, for example, the input voltage $V_{DD}$ and the divided voltage $V_{det}$ are greater than the reference voltages $V_{ref}B$, a comparison result (L: Low) is output from the comparator 301, the gate of the transistor 306 for resistance ratio control is turned off, and the resistance ratio of the voltage dividing unit 305 is determined by the resistors 302, 303, and 304. On the other hand, if the divided voltage $V_{det}$ is less than the reference voltage $V_{ref}B$, a comparison result (H: High) is output from the comparator 301, the gate of the transistor 306 for resistance ratio control is turned on, and the resistance ratio of the voltage dividing unit 305 is determined by the resistors 302 and 303.

The step-up unit 200 includes a switching signal generating unit 201 for periodically generating a control signal (ON/OFF) based on the comparison result (L or H) of the comparator 301, a logic circuit 202 for outputting an ON/OFF signal for controlling a transistor 203 for first voltage control and a transistor 205 for second voltage control based on the control signal (ON/OFF) periodically provided by the switching signal generating unit 201, the transistor 203 for the first voltage control, which transistor 203 is a N channel type MOS transistor (NMOS transistor) for connecting/disconnecting ground potential GND and a coil 206 by opening and closing the gate based on the ON/OFF signal provided by the logic circuit 202, a reversing unit 204 for reversing the ON/OFF signal provided by the logic circuit 202 and for providing the reversed signal to the transistor 205 for the second voltage control, the transistor 205 for the second voltage control, which transistor 205 is a PMOS transistor, for connecting the output terminal OUT and the coil 206 by opening and closing the gate based on the reversed ON/OFF signal provided by the reversing unit 204, the coil 206 for periodically repeating charging (storing energy) when the transistor 203 for the first voltage control is turned on and discharging the energy when the transistor 205 for the second voltage control is turned on so that the input voltage $V_{DD}$ may be stepped up (increased), a latch circuit 207 for holding the status wherein the input voltage $V_{DD}$ monitored by the monitoring unit 300 becomes below a set-up voltage until the power source of the voltage regulator is turned off, and a transistor 208 for third voltage control for preventing a reverse current from flowing to the input terminal IN from the output terminal OUT by closing the gate so that the output terminal OUT and the input terminal IN are isolated from each other when the status wherein the input voltage $V_{DD}$ is less than the set-up voltage (predetermined reference voltage $V_{ref}B$} is held by the latch circuit 207.

Next, exemplary operations of the voltage regulator are specifically described in the case wherein the input voltage $V_{DD}$ becomes below a voltage at which the load 400 can operate, and the input voltage $V_{DD}$ is stepped up (increased). In this example, the following conditions are premised; namely, reference-voltage $V_{ref}A=1$ V, resistance of the resistor 102=2 MΩ, resistance of the resistor 103=1 MΩ, output-voltage $V_{DC}=3$ V, and reference-voltage $V_{ref}B$ of the comparator 301=3.1 V.

When power supply is started from the voltage regulator to the load 400, the operational amplifier 106 amplifies the difference voltage between the divided voltage $V_d$ (=1 V) and the reference voltage $V_{ref}A$ (=1 V), which divided voltage $V_d$ is obtained by the voltage dividing unit 104, and outputs the amplified difference voltage to the gate of the transistor 105 so that the output voltage $V_{DC}$ may stay constant at the predetermined voltage.

The comparator 301 monitors the input voltage $V_{DD}$ provided by the output unit 100. When the input voltage $V_{DD}$ falls to the reference voltage $V_{ref}B$, the comparator 301 outputs a comparison result (H), and the control signal (ON/OFF) is periodically provided from the switching signal generating unit 201. Simultaneously, the latch circuit 207 holds the status wherein the input voltage $V_{DD}$ is below the reference voltage $V_{ref}B$, and the transistor 208 for the third voltage control closes the gate so that the output terminal OUT and the input terminal IN are isolated from each other to prevent a reverse current from flowing from the output terminal OUT to the input terminal IN. The latch circuit 207 holds the status wherein the input voltage $V_{DD}$ is below the reference voltage $V_{ref}B$ until the power source of the voltage regulator is once turned off and the power source is turned on, or until an enable function of the whole circuit is turned off, and the transistor 208 for the third voltage control closes the gate.

If the control signal (ON/OFF) is periodically provided by the switching signal generating unit 201 based on the comparison result (H) of the comparator 301, the logic circuit 202 periodically outputs the signal for controlling ON/OFF of the gates of the transistor 203 for the first voltage control and the transistor 205 for the second voltage control according to the control signal.

When the control signal provided by the switching signal generating unit 201 is ON, an ON signal is provided by the logic circuit 202, and the transistor 203 for the first voltage control opens the gate and connects the coil 206 to GND. On the other hand, the ON signal provided to the reversing unit 204 by the logic circuit 202 is reversed and turns into an OFF signal, and the OFF signal is provided to the transistor 205 for the second voltage control. With the OFF signal, the transistor 205 for the second voltage control closes the gate, and disconnects the coil 206 from the transistor 105. Then, a current flows in the coil 206 and electric energy is stored in the coil 206. When the control signal from the switching signal generating unit 201 is H, an OFF signal is provided by the logic circuit 202, and the transistor 203 for the first voltage control closes the gate and disconnects the coil 206 from GND. On the other hand, the OFF signal provided to the reversing unit 204 from the logic circuit 202 is reversed and turns into an ON signal, and the ON signal is provided to the transistor 205 for the second voltage control. With the ON signal, the transistor 205 for the second voltage control opens the gate, and connects the coil 206 and the transistor 105. Then, energy stored by the coil 206 is discharged to the transistor 105, and the voltage $V_{IN}$ that is a voltage stepped-up by the step-up unit 200 is provided to the transistor 105. The transistor 105 adjusts the voltage $V_{IN}$ to the predetermined output voltage $V_{DC}$, and outputs the $V_{DC}$ to the output terminal OUT. By repeating the operations as described above according to the frequency of the switching signal, the input voltage $V_{DD}$ is stepped up to the reference voltage $V_{ref}B$ of the comparator 301, and the output voltage $V_{DC}$ is held at the predetermined voltage.

The transistor 306 for resistance ratio control turns on the gate based on the comparison result (H). The comparison result (H) is provided by the comparator 301 if the divided voltage $V_{det}$ becomes below the reference voltage $V_{ref}B$. Then, the resistance ratio of the voltage dividing unit 305 is determined by the resistors 302 and 303, and a setting voltage (the voltage applied to the inverting input terminal of the comparator 301) is raised. Then, the comparator 301 provides the comparison result (H) until the input voltage $V_{DD}$ reaches the setting voltage, and the step-up unit 200 continues to raise the voltage until the voltage reaches the setting voltage. When the input voltage $V_{DD}$ reaches the setting voltage, a comparison result (L) is provided by the comparator 301, and the transistor 306 for resistance ratio control turns off the gate based on the comparison result (L). Then, the resistance ratio of the voltage dividing unit 305 is determined by the resistors 302, 303, and 304, i.e., the setting voltage is decreased.

Figure 4:
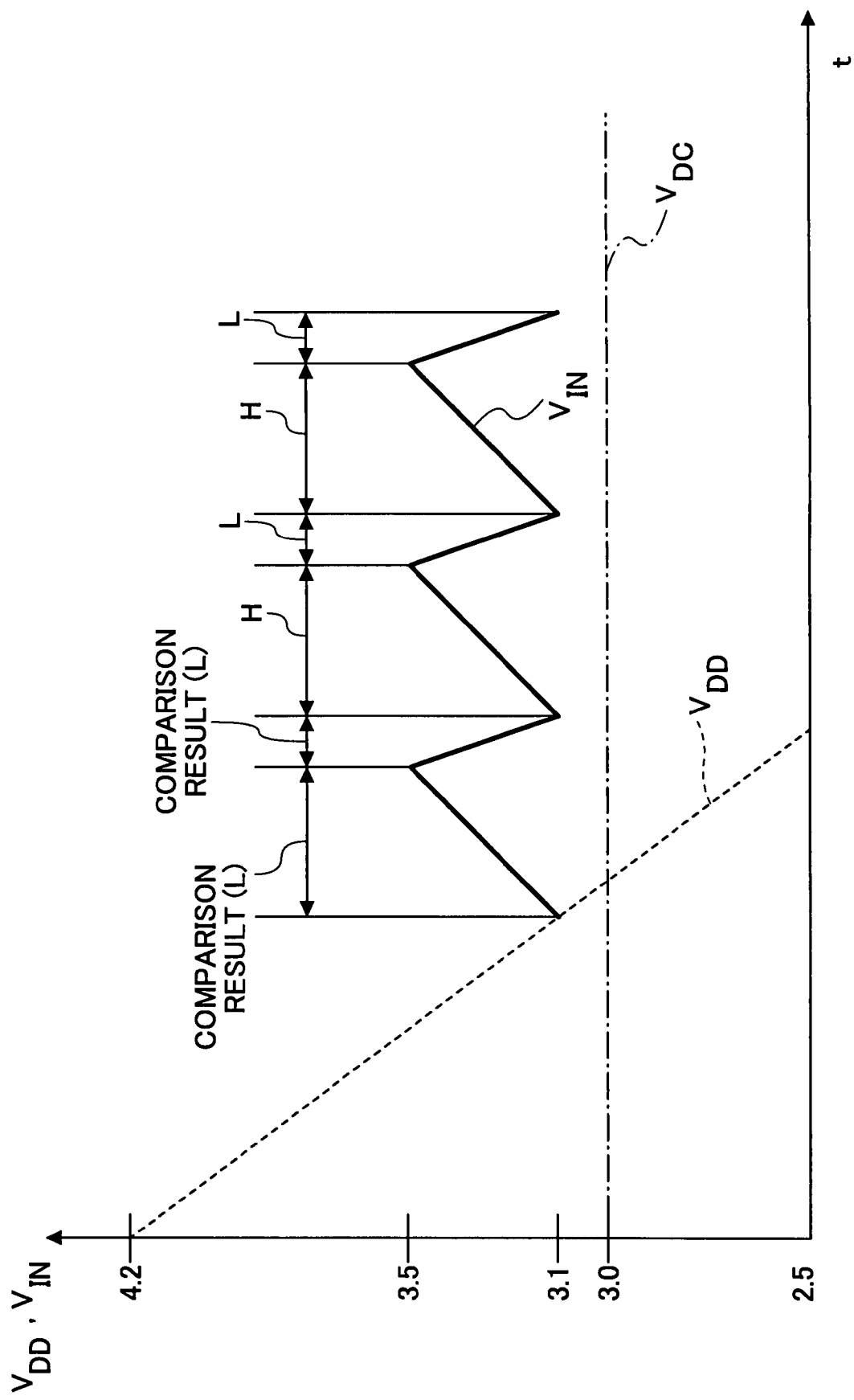
FIG. 4 is a graph showing changes of an input voltage provided to the voltage regulator according to the embodiment of the present invention.

FIG. 4 shows changes of the $V_{DD}$ provided through the input terminal IN, and the voltage $V_{IN}$ that is stepped up by the step-up unit 200 and provided to the output unit 100. The vertical axis represents the input voltage $V_{DD}$ and the voltage $V_{IN}$. The horizontal axis represents time t. A broken line represents the input voltage $V_{DD}$, and a solid line represents the voltage $V_{IN}$. Here, it is assumed that the output unit 100 outputs 3.0 V to a load.

The input voltage $V_{DD}$ from a battery gradually descends from 4.2 V as the power supply to the load continues. If the input voltage $V_{DD}$ becomes less than the reference voltage $V_{ref}B$ (=3.1 V), a comparison result (H) is provided by the comparator 301, and the step-up unit 200 starts stepping up the voltage. Simultaneously, the comparison result (H) turns on the gate of the transistor 306 for resistance ratio control, and changes the resistance ratio of the voltage dividing unit 305. Then, the setting voltage is raised from 3.1 V to 3.5 V. If the $V_{IN}$ that is the input voltage $V_{DD}$ stepped up reaches 3.5 V, the comparator 301 provides a comparison result (L), and stepping up by the step-up unit 200 is completed. Simultaneously, the comparison result (L) turns of the gate off the transistor 306 for resistance ratio control, and changes the resistance ratio of the voltage dividing unit 305. Then, the setting voltage is decreased from 3.5 V to 3.1 V. According to the voltage regulator of the embodiment of the present invention, the output voltage $V_{DC}$ is prevented from decreasing by repeating the operations described above. $V_{DD}$ may drop, but the output voltage $V_{DC}$ is kept constant.

As described, the voltage regulator according to the embodiment of the present invention is capable of providing a constant output voltage regardless of a fluctuation of the input voltage by monitoring the input voltage by the monitoring unit, and stepping up the output voltage by discharging the step-up unit when the input voltage becomes below a predetermined level due to consumption of the battery energy.

Next, a voltage regulator according to another embodiment of the present invention is described.

Figure 2:
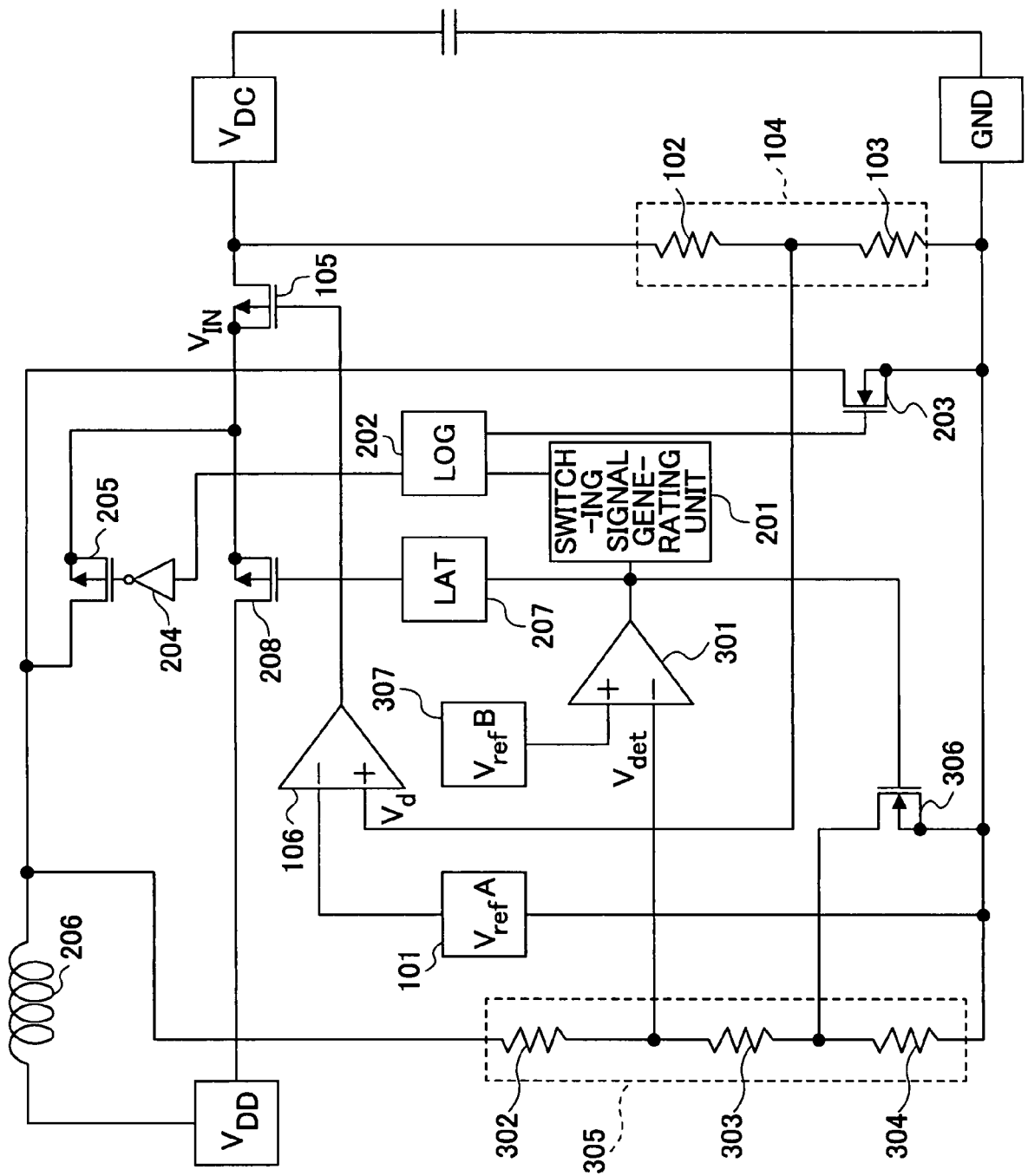
FIG. 2 is a block diagram of a specific example of the voltage regulator according to the embodiment of the present invention.
Figure 3:
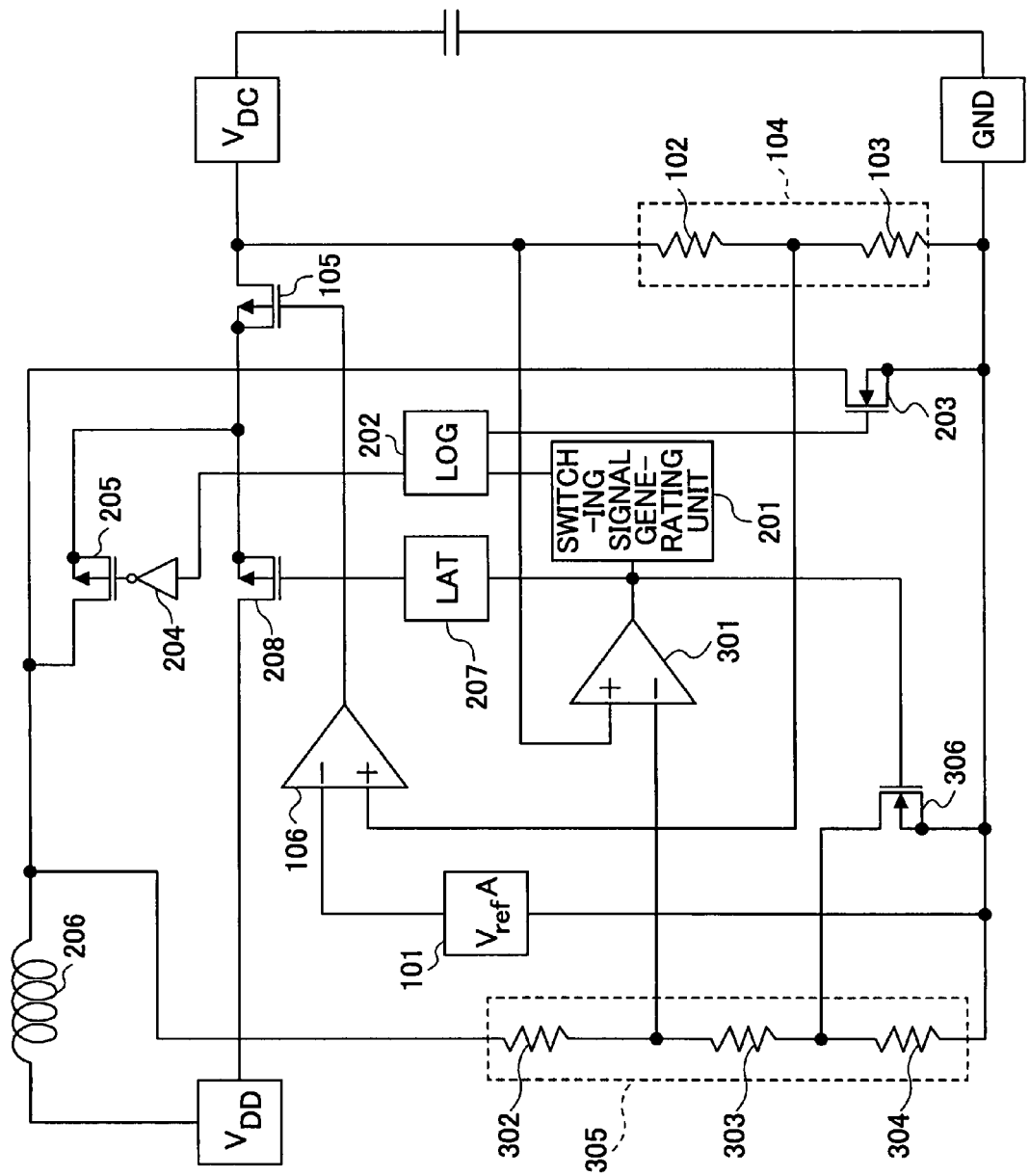
FIG. 3 is a block diagram of another example of the voltage regulator.

As shown in FIG. 3, the voltage regulator according to the present embodiment differs from the voltage regulator shown in FIG. 2 in that the input voltage $V_{DD}$ is compared with the output voltage $V_{DC}$, rather than with the reference voltage $V_{ref}B$ in the case of FIG. 2. When the reference voltage $V_{ref}B$ generated by the reference voltage generating unit 307 is defined in an absolute value, it is necessary that the reference voltage $V_{ref}B$ be defined greater than really necessary in consideration of tolerance. However, with the voltage regulator shown in FIG. 3, the voltage for controlling ON/OFF of the step-up unit 200 can be suitably switched by comparing the input voltage $V_{DD}$ with the output voltage $V_{DC}$. Otherwise, the voltage regulator shown in FIG. 3 is the same as that shown in FIG. 2; and no further descriptions are repeated.

Further, the present invention is not limited to these embodiments, but variations and modifications may be made without departing from the scope of the present invention.

The present application is based on Japanese Priority Application No. 2006-175624 filed on Jun. 26, 2006 with the Japanese Patent Office, the entire contents of which are hereby incorporated by reference.

What is claimed is:

1. A voltage regulator that includes an output unit for converting an input voltage provided by a power source into a predetermined voltage, and for outputting the converted voltage, comprising:
   a monitoring unit for determining whether the input voltage provided by the power source is greater than a reference voltage; and
   a step-up unit for stepping up the input voltage provided by the power source if the monitoring unit determines that the input voltage is less than the reference voltage;
   wherein the output unit includes
   a converting unit for converting the stepped-up voltage into the predetermined voltage,
   wherein the monitoring unit includes:
   a reference voltage generating unit for generating the reference voltage;
   a comparing unit for comparing the input voltage with the reference voltage, and for providing a signal that turns the step-up unit on if the monitoring unit determines that the input voltage is less than the reference voltage; and
   a voltage dividing unit for dividing the input voltage provided to the comparing unit from the power source, and
   wherein the voltage dividing unit includes a plurality of resistors between an output terminal and an inverting input terminal of the comparing unit such that hysteresis is provided to the comparing unit.

2. The voltage regulator as claimed in claim 1, wherein the voltage dividing unit further includes:
   a resistance ratio control unit for changing a resistance ratio of the voltage dividing unit by turning off one of the resistors when the signal for turning the step-up unit on is provided by the comparing unit.

3. The voltage regulator as claimed in claim 1, wherein the step-up unit includes:
   a disconnecting unit for disconnecting the output unit from the input voltage provided by the power source when the signal for turning the step-up unit on is provided by the comparing unit.

4. The voltage regulator as claimed in claim 3, wherein the disconnecting unit includes:

a storage unit for holding the signal for turning the step-up unit on provided by the comparing unit until the voltage regulator is turned off; and a voltage control unit for disconnecting the output unit from the input voltage provided by the power source while the signal for turning the step-up unit on is stored in the storage unit.

5. The voltage regulator as claimed in claim 1, wherein the step-up unit includes:

a switching signal generating unit for periodically generating an ON/OFF signal when the signal for turning the step-up unit on is provided by the comparing unit;

a coil for stepping up the input voltage provided by the power source;

a first switch for connecting and disconnecting the coil and a ground potential according to the ON/OFF signal provided by the switching signal generating unit;

a reversing unit for reversing the ON/OFF signal provided by the switching signal generating unit; and a second switch for connecting and disconnecting the coil and the output unit according to the reversed ON/OFF signal;

wherein the first and the second switches are opened and closed according to the periodic ON/OFF signal provided by the switching signal generating unit.

6. A voltage regulator that includes an output unit for converting an input voltage provided by a power source into a predetermined voltage, and for outputting the converted voltage, comprising:

a monitoring unit for determining whether the input voltage provided by the power source is greater than a voltage defined based on an output voltage; and a step-up unit for stepping up the input voltage provided by the power source if the monitoring unit determines that the input voltage is less than the voltage defined based on the output voltage;

wherein the output unit includes a converting unit for converting the stepped-up voltage into the predetermined voltage, wherein the monitoring unit includes:

a reference voltage generating unit for generating the voltage defined based on the output voltage;

a comparing unit for comparing the input voltage with the voltage defined based on the output voltage, and for providing a signal that turns the step-up unit on if the monitoring unit determines that the input voltaae is less than the voltage defined based on the output voltage; and a voltage dividing unit for dividing the input voltage provided to the comparing unit from the power source, and wherein the voltage dividing unit includes a plurality of resistors between an output terminal and an inverting input terminal of the comparing unit such that hysteresis is provided to the comparing unit.

\* \* \* \* \*